United States Patent
Briane et al.

(10) Patent No.: US 11,828,390 B2
(45) Date of Patent: Nov. 28, 2023

(54) TUBULAR THREADED CONNECTION

(71) Applicants: VALLOUREC OIL AND GAS FRANCE, Aulnoye-Aymeries (FR); NIPPON STEEL CORPORATION, Chiyoda-ku (JP)

(72) Inventors: Benoit Briane, Boulogne-Billancourt (FR); Alan Fothergill, Boulogne-Billancourt (FR); Anthony Foulogne, Boulogne-Billancourt (FR); Pierre Martin, Boulogne-Billancourt (FR)

(73) Assignees: VALLOUREC OIL AND GAS FRANCE, Aulnoye-Aymeries (FR); NIPPON STEEL CORPORATION, Chiyoda-ku (JP)

(*) Notice: Subject to any disclaimer, the term of this patent is extended or adjusted under 35 U.S.C. 154(b) by 158 days.

(21) Appl. No.: 17/054,678

(22) PCT Filed: May 24, 2019

(86) PCT No.: PCT/EP2019/063436
§ 371 (c)(1),
(2) Date: Nov. 11, 2020

(87) PCT Pub. No.: WO2019/224344
PCT Pub. Date: Nov. 28, 2019

(65) Prior Publication Data
US 2021/0247004 A1   Aug. 12, 2021

(30) Foreign Application Priority Data

May 25, 2018 (EP) .................... 18305639

(51) Int. Cl.
*F16L 15/00* (2006.01)
*E21B 17/042* (2006.01)

(52) U.S. Cl.
CPC ........ *F16L 15/002* (2013.01); *E21B 17/0423* (2013.01)

(58) Field of Classification Search
CPC ... F16L 15/001; F16L 15/002; E21B 17/0423; E21B 17/042
See application file for complete search history.

(56) References Cited

U.S. PATENT DOCUMENTS

| 4,373,754 A | * | 2/1983 | Bollfrass | ............ E21B 17/0426 285/334 |
| 4,753,460 A | * | 6/1988 | Tung | .................. E21B 17/0423 285/331 |

(Continued)

FOREIGN PATENT DOCUMENTS

| CA | 3 031 919 A1 | 4/2018 |
| JP | 10-89554 A | 4/1998 |
| WO | WO 2017/130234 A1 | 8/2017 |

OTHER PUBLICATIONS

Andreas Velling, Guide to CNC Machining Tolerances, Oct. 11, 2020, Fractory, https://fractory.com/cnc-machining-tolerances/#:~:text=For%20CNC%20machining%2C%20the%20standard,function%20may%20not%20even%20matter. (Year: 2020).*

(Continued)

*Primary Examiner* — Zachary T Dragicevich
*Assistant Examiner* — Alexander T Rufrano
(74) *Attorney, Agent, or Firm* — Oblon, McClelland, Maier & Neustadt, L.L.P.

(57) ABSTRACT

Threaded tubular connection comprising a tubular female end extending from a main body of a first tubular member, and a tubular male end extending from a main body of a second tubular member, such that the tubular female end comprises a machined outer cylindrical surface close to the female free end having a first outer diameter and a second machined outer cylindrical surface above a threaded portion (Continued)

of the female end, a second outer diameter of the second outer cylindrical surface being bigger than the first outer diameter.

21 Claims, 6 Drawing Sheets

(56) References Cited

U.S. PATENT DOCUMENTS

| | | | | |
|---|---|---|---|---|
| 5,415,442 | A * | 5/1995 | Klementich | F16L 15/004 29/237 |
| 6,347,814 | B1 | 2/2002 | Cerruti | |
| 6,481,760 | B1 * | 11/2002 | Noel | F16L 15/06 411/311 |
| 6,494,499 | B1 * | 12/2002 | Galle, Sr. | E21B 17/0423 285/333 |
| 9,863,560 | B2 * | 1/2018 | Durivault | E21B 43/106 |
| 10,145,495 | B2 * | 12/2018 | Elder | F16L 15/06 |
| 10,487,594 | B2 * | 11/2019 | Aguilar Mendez | F16L 57/005 |
| 2006/0162145 | A1 | 7/2006 | Verger et al. | |
| 2007/0039149 | A1 | 2/2007 | Roussie | |
| 2012/0325361 | A1 * | 12/2012 | Durivault | E21B 17/08 138/109 |
| 2014/0084582 | A1 | 3/2014 | Elder et al. | |
| 2015/0069752 | A1 * | 3/2015 | Farquhar | E21B 17/0423 285/334 |
| 2019/0032820 | A1 | 1/2019 | Inose et al. | |

OTHER PUBLICATIONS

International Search Report dated Jul. 26, 2019 in PCT/EP2019/063436 filed May 24, 2019.

* cited by examiner

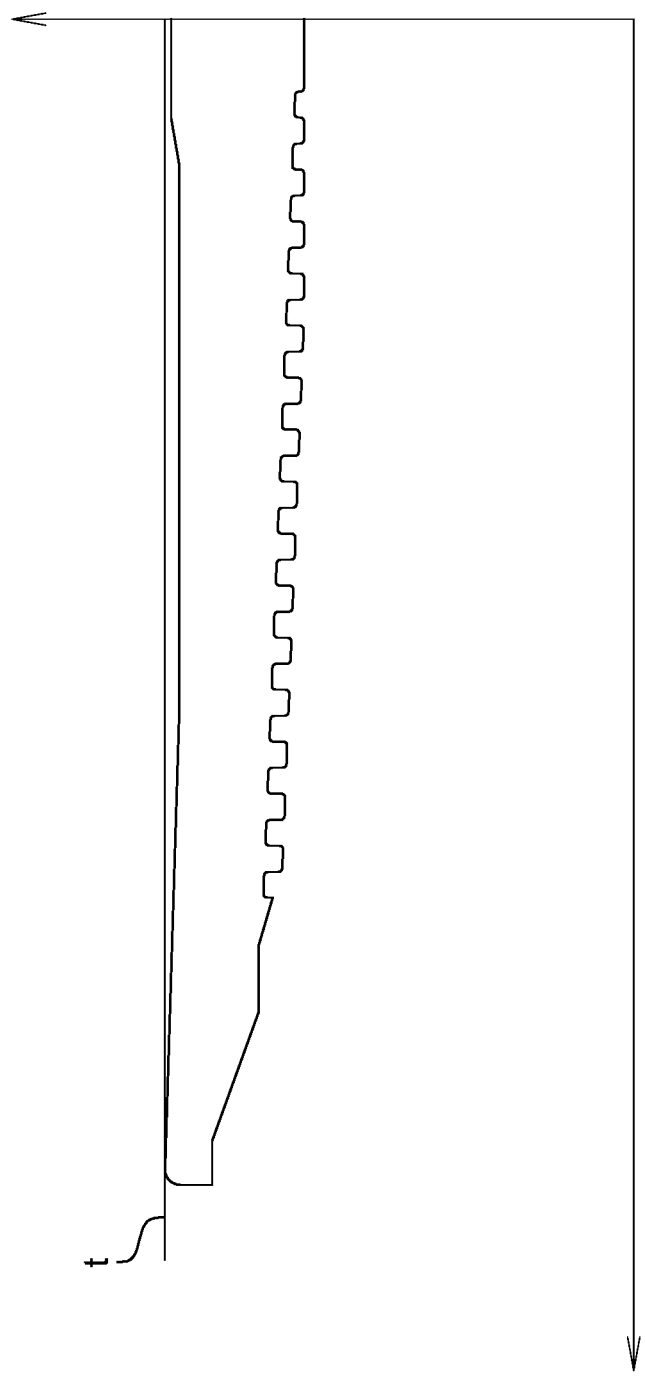

TUBULAR THREADED CONNECTION

BACKGROUND

Field

The present invention relates to the field of tubular threaded connections, and joints or assemblies of tubes to be connected by threads.

More particularly, the invention concerns tubes used in industry and, in particular, assemblies or threaded junctions used in string-lines for tubing or for lines of tubular production accessories or for a casing or a liner or a riser for the operation or prospecting or exploitation of oil or gas wells.

The threaded assembly described herein is particularly useful in the assembly of metal tubes used for the casing of oil or gas wells. Casing are needed to maintain borehole stability, prevent contamination of water sands, and control well pressures during drilling, production, and or workover operations.

Those casing tubes are made of steel, according to API standards Specification 5CT for Casing and Tubing. For example, the steel is one of grade L80, P110 or Q125 standards.

Such threaded tubular connections are subjected to a variety of combination of stresses that may vary in intensity or change in direction, such as, for example, axial tension, axial compression, inner pressure bending force, torsional force, etc. . . . . Threaded tubular connections are thus designed to support those stresses, withstand rupture and provide tight sealing.

DESCRIPTION OF THE RELATED ART

Numerous types of assemblies are known for petroleum or gas carrying tubes that yield satisfactory results from the viewpoint of mechanical characteristics and tightness, even under tough conditions of use.

A first challenge for casing of oil or gas wells is to install them in the well without damaging their inner and outer surfaces. Casing strings are a succession of pipes, a first serie of casing tubes is of a larger outer diameter than a second serie of casing tubes intended to be jointed to the first serie, but installed deeper in the well. Casing strings are structured such that the diameter progressively reduces as it goes deeper in the well. But transition shall be smooth.

Thus it is needed to insert a new serie of casing having a specific outer diameter into a previously installed serie of casing having a larger diameter and a specific inner diameter. In order to avoid damaging the inner surface of casing already settled in the well, it is required to manage the outer diameter of the new serie of casing. API standard are providing regulation on that topic. Of course, all series of casing shall also comply with efficiency requirement at the location of each connection between two adjacent casing tubes. Connection efficiency or joint efficiency is defined as a ratio of joint tensile strength to pipe body tensile strength, ratio which is evaluated under more severe well conditions, as high external pressure, high internal pressure, high compression or high tension.

Known assemblies comprise tubes equipped with male threads at both ends, assembled by couplings having two corresponding female threads. This type of assembly offers the advantage of rendering the two components of the assembly rigid, due to positive thread interference created between the male and female threads.

However, the outer diameter of these couplings is greater than the outer diameter of the corresponding tubes and, when these assemblies are used with casing tubes, the couplings require that bore holes with increased diameter be drilled to accommodate the outer diameter of the couplings.

In order to overcome this disadvantage, it is common to use assemblies without a coupling or a sleeve, referred to as semi-flush, flush or integral assemblies or junctions or connections. The tubular elements of those integral assemblies each comprise one male threaded end and one female threaded end.

Integral assemblies are generally made on tubes having sized end, respectively an expanded outer diameter at the female threaded end and a swaged outer diameter at the male threaded end, in order to provide a thickness of the connection sufficient enough to ensure mechanical strength of the connection. Expansion and swaging allow to provide higher efficiency to the connection. Both helps minimizing a maximum outer diameter and respectively minimum inner diameter at the location of the connection. Thus the connection allows to maintain a certain level of drift operability, to ease installation in the bore hole without damaging existing casing and to withstand standard for flush or semi-flush integral connection. Flush connection are such that a ratio between outer diameter of the connection over a nominal outer diameter of the tubes is around 1%; whereas ratio for semi-flush are around 2 to 3%.

Reference can be made to document WO 2014/044773 which describes an integral semi-flush threaded tubular connection comprising a first tubular member provided with a tubular male end and a second tubular member provided with a tubular female end. Each of the female and male ends comprises two steps of tapered threads axially and an off-center seal. The aim of this document is to increase the tensile efficiency of the connection, by providing a specific relationship between critical cross-section areas.

However, tolerances in the industry about target nominal diameter dimension, swaging and expansion process, as well as ovality tolerances, are such that it may happen that in some case, due to deflection of the free end (terminal end) of the female end during make-up of the connection, the outer diameter of the female free end may locally create an outer sharp annular edge. The same may occur due to deflection of the free end (terminal end) of the male end during make-up of the connection, the inner diameter of the male free end may locally create an inner sharp annular edge. Thus during installation of a tubing into a casing, or a casing into a casing, friction may occur at between those sharp annular edge and the additional tubing or casing. Friction may create a premature failure of the casing or tubing, even prior production wear. Friction may lead to loose seal efficiency.

There is a need to improve integral threaded tubular connections in order to increase both seal efficiency and tensile efficiency of the connection, while increasing tubing and casing wear robustness.

BRIEF SUMMARY

One aim of the present invention is to overcome these drawbacks.

It is a particular object of the present invention to provide a threaded tubular connection capable of absorbing axial and radial loads as well as supporting radial deformation which may occur under high radial loads, while being compact notably in radial direction.

A threaded tubular connection according to the invention comprises:
- a tubular female end extending from a main body of a first tubular member, the tubular female end comprising
  - a female external thread between a female shoulder and a female free end, and
  - a female internal thread, such that the female shoulder is a female intermediate shoulder located between the female external thread and the female internal thread,
- a tubular male end extending from a main body of a second tubular member, the tubular male end comprising
  - a male external thread, a male internal thread and a male shoulder, said male external thread is configured to interlock by thread engagement with the female external thread, said male internal thread is configured to interlock by thread engagement with the female internal thread, and
- wherein the tubular female end comprises a first machined outer surface of the female end close to the female free end, a second outer diameter (JOB2) above at least one thread root of the female internal thread such that the second outer diameter (JOB2) is bigger than a first outer diameter (JOB) of the first machined outer surface, and wherein the female free end is free of axial abutment contact with the tubular male end.

According to the invention, the female free end may slightly be deflected during make up, due to a lack of any axial abutment with the tubular male end during make up. The female free end is longitudinally away from any part of the tubular male end when the connection is made up.

Preferably, the first machined outer surface may extend above at least one thread root of the female external thread. The second outer diameter (JOB2) of the tubular female end may be located above the intermediate shoulder.

For example, an outer surface of the tubular female end having a greater outer diameter than the first outer diameter (JOB) may extend at least over a portion starting from a first box critical cross section (BCCS1) up to a second box critical cross section (BCCS2, BCCS3) of the tubular female end.

Advantageously, the second outer diameter (JOB2) may be constant over a second cylindrical surface, and the first machined outer surface comprises a cylindrical surface defined with that first outer diameter. The outer surface of the tubular female end having a greater outer diameter than the first outer diameter (JOB) may not exclusively be of a cylindrical shape, it may also encompass an outwardly tronconical portion, a cylindrical portion, and/or an inwardly tronconical portion.

For example, the second cylindrical surface may extend above the intermediate shoulder, and/or above a second box critical cross section (BCCS2) located at a first engaged thread root of the female internal thread close to an internal shoulder, and/or above part of the female internal thread, such that the first machined outer surface extends above part of the female external thread.

The tubular female end may in addition comprise a female external sealing surface, and correspondingly the tubular male end may comprise a male external sealing surface, such that male and female external sealing surfaces are forming an external metal-to-metal seal when the threaded tubular connection is made up, such that an outer diameter of the tubular female end above that female external sealing surface is equal to the first outer diameter (JOB). Then the female external sealing surface may be located between the female external thread and the female free end. Alternatively, the female external sealing surface may be located between the female external thread and the intermediate shoulder.

According to one embodiment of the invention, the male free end may be longitudinally away from the internal shoulder when the connection is made up. Preferably, the female intermediate shoulder and the male intermediate shoulder may abut when the connection is made up.

The male and female thread, respectively external and internal, may preferably be offset radially with respect to a longitudinal axis of the threaded connection. Thus, even with a same taper angle of both external and internal thread, a conical envelope of the female external thread would not be aligned with a conical envelope of female internal thread.

Advantageously, the machined outer surface of the female end and a cylindrical surface having said second outer diameter (JOB2) may be connected with a taper surface forming a fitting angle α2 comprised between 1° and 10°, preferably between 5° and 7°, for example equal to 6°.

A cylindrical surface having said second outer diameter (JOB2) may be connected to the main body of the first tubular member having a nominal outer diameter (OD) with a taper surface forming an expansion angle α1 comprised between 2° and 5°, for example equal to 3°.

The tubular female end may in addition comprise a female internal sealing surface, the tubular male end may correspondingly comprise a male internal sealing surface, wherein the female internal sealing surface would be located between the female internal thread and an internal shoulder, the male internal sealing surface would be located between the male internal thread and a male free end, such that male and female internal sealing surfaces are forming an internal metal-to-metal seal when the threaded tubular connection is made up.

According to one embodiment of the invention, the taper surface with the expansion angle α1 may extend above a groove located between the female internal thread and the female internal sealing surface.

Preferably, a delta (JOB2-JOB) between the second outer diameter (JOB2) and the first outer diameter (JOB) may be set between 30% and 130% of the diametrical interference of the external metal-to-metal seal, preferably between 25% and 115% of a maximum diametrical interference value, such maximum diametrical interference value being the highest value among diametrical interference values of the external thread, the internal metal-to-metal seal, and the external metal-to-metal seal.

A ratio (JOB2/OD) between the second outer diameter (JOB2) and a nominal outer diameter of the main body of the first tubular member may be comprised between 100.5% flush and 104%, preferably between 101.0% and 103.5%, even more preferably between 101.5% and 102.5, for example equal to 102.3%.

Due to the benefit of the specific structure of the invention, after thread engagement of the tubular female end with the tubular male end, at the end of make-up of the threaded tubular connection, an outer diameter of the tubular female end at both locations above the external thread and internal thread remain below a same threshold of 105%, and preferably below 103% of a nominal outer diameter of the main body.

BRIEF DESCRIPTION OF THE SEVERAL VIEWS OF THE DRAWINGS

The present invention and its advantages will be better understood by studying the detailed description of specific embodiments given by way of non-limiting examples and illustrated by the appended drawings on which

FIG. 7 is a diagram view of the deflection of the female tubular member as shown in FIG. 2 after make-up with a male tubular member as of FIG. 3.

DETAILED DESCRIPTION

For clarity reasons, cross sectional view are partial in the sense that they are sectional view along a plane transverse to a longitudinal axis X-X' of the tubular member, and only one of the two cross-section of the tubular member is shown.

Figure 1:
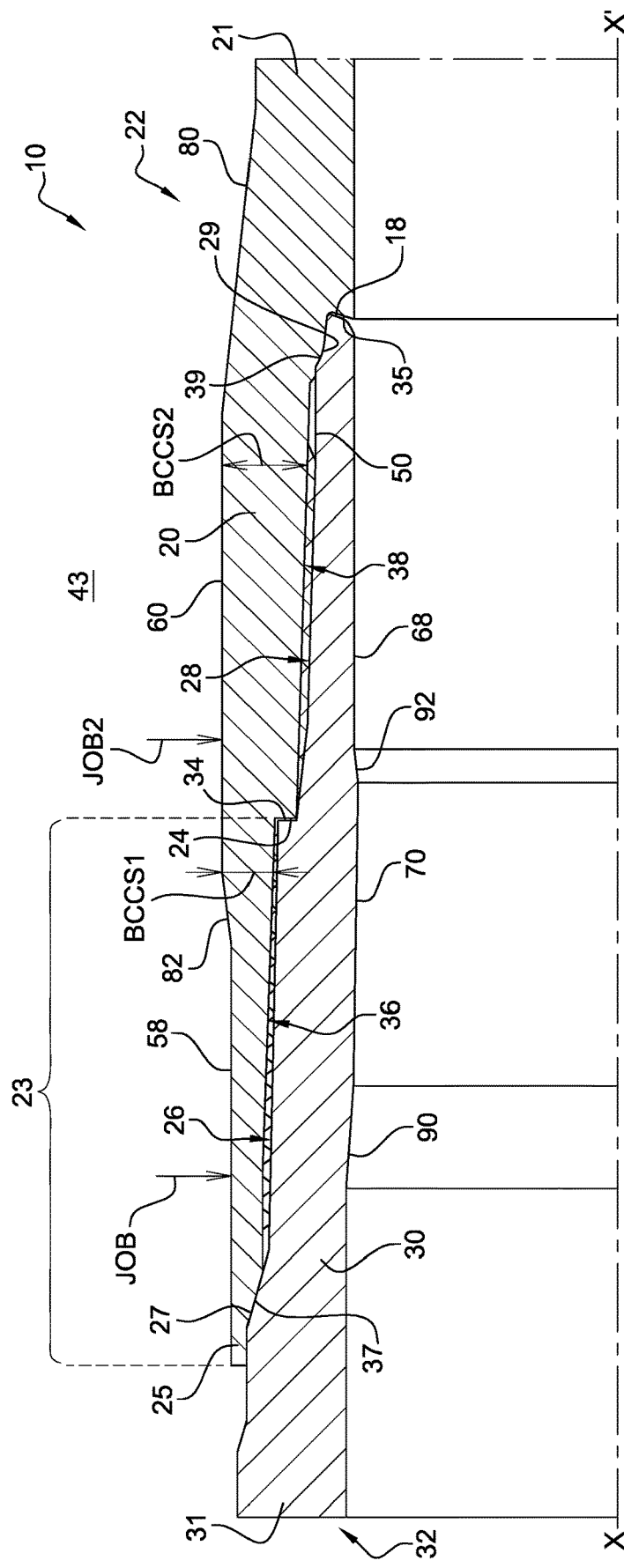
FIG. 1 is a partial cross-sectional view of a threaded connection according to an embodiment of the invention, in a connected state.

An embodiment of a threaded tubular connection 10 having a longitudinal axis X-X' is illustrated on FIG. 1; said threaded tubular connection 10 comprising a first tubular member 22 and a second tubular member 32, with a same longitudinal axis X-X' when connected.

The first tubular member 22 is provided with a main body 21 referred to as "female main body" and a tubular female end 20 referred to as "box member". The box member 20 extends from the female main body 21. The box member 20 defines a terminal end 25 of said first tubular member 22. The terminal end 25 is a female free end of the box member 20. Female main body 21 presents a nominal outer diameter which is substantially constant over the length of that main body 21 along XX' axis. Preferably an inner nominal diameter ID of that female main body 21 is substantially constant over the length of that main body 21 along XX' axis.

The second tubular member 32 is provided with a main body 31 referred to as "male main body" and a tubular male end 30 referred to as "pin member". The pin member 30 extends from the male main body 31. The pin member 30 defines a terminal end 35 of said second tubular member 32. The terminal end 35 is a male free end of the pin member 30. Male main body 31 presents a nominal outer diameter which is substantially constant over the length of that main body 31 along XX' axis. Preferably an inner nominal diameter of that male main body 31 is substantially constant over the length of that main body 31 along XX' axis.

Main bodies 21 and 31 have same nominal inner diameter ID and nominal outer diameter OD, and thus same pipe width. Preferably, both outer nominal diameter OD and inner nominal diameter ID of main bodies 21 and 31 are substantially constant over the length of those main bodies 21 and 31 along XX' axis.

The threaded tubular connection 10 as illustrated is an integral connection in contrast to assemblies or junctions using a coupling or a sleeve. An expanded zone of the first tubular member 22 having a greater outer diameter than nominal outer diameter of main bodies 21 and 31 forms the box member 20. A swaged zone of the second tubular member 32 having a reduced inner diameter compared to a nominal inner diameter of the male main body 31 forms pin member 30.

To manufacture such female end, the first tubular element is first swelled, by using for example cold forming techniques, to expand the outer diameter of the entire box member and to provide a conical tapered outer surface 80 forming an angle α1 comprised between 3° and 4°, for example equal to 3°, with the outer cylindrical surface of the female main body 21.

To manufacture such male end, the second tubular element is first swaged, by using for example cold forming techniques, to reduce the inner diameter of the entire pin member and to provide a conical inner surface 90 forming an angle α3 comprised between 3° and 4°, for example equal to 3°, with the inner cylindrical surface of the male main body 31.

The threaded tubular connection 10 may be a threaded flush or semi-flush integral connection.

Figure 2:
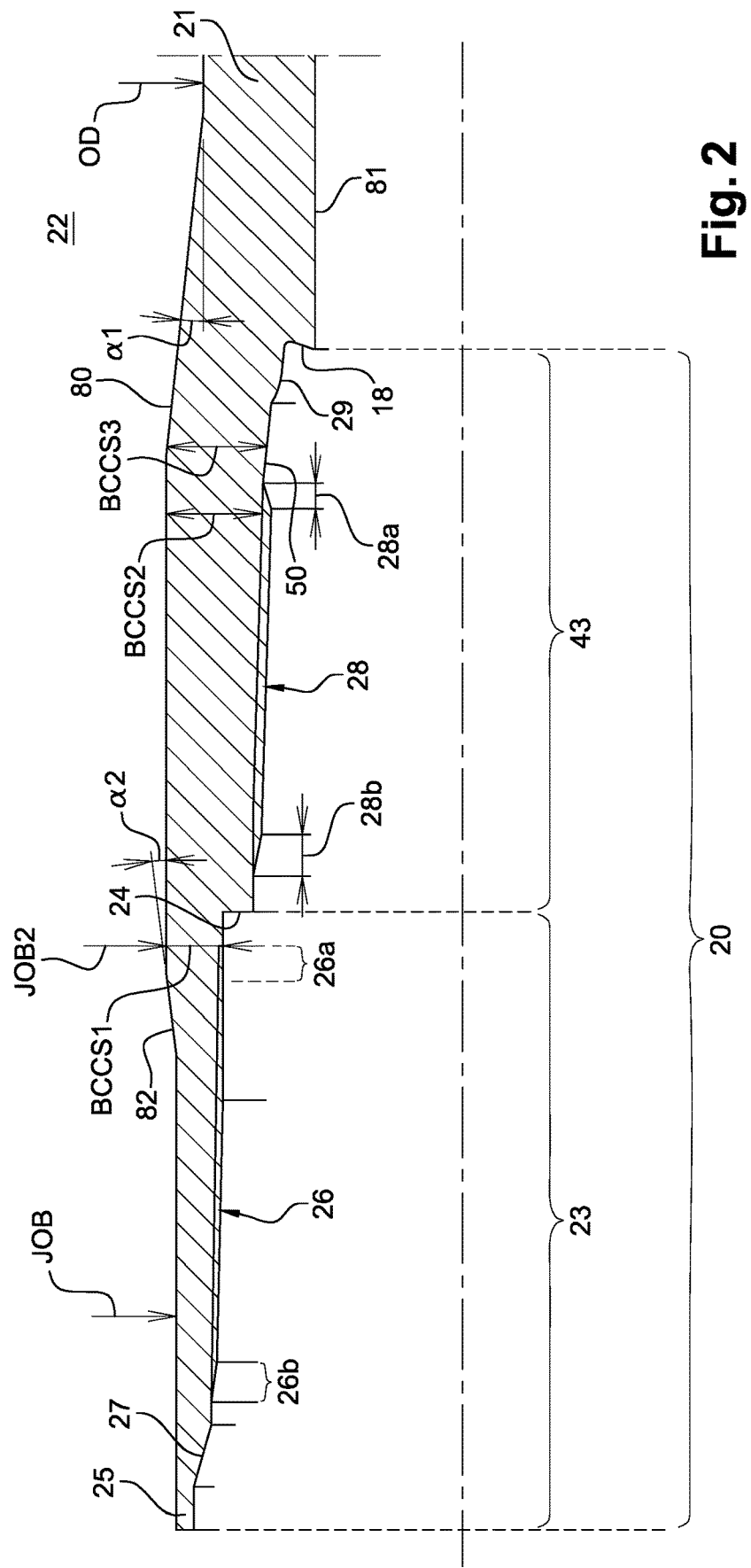
FIG. 2 is a partial cross-sectional view of a female tubular member of FIG. 1.

As illustrated in detail on FIG. 2, the free end 25 is preferably an annular surface defined perpendicularly to the XX' axis. The box member 20 comprises on its inner profile a female external sealing surface 27 and a female external thread 26, such that the female external sealing surface 27 is located between the female free end 25 and the female external thread 26. The box member 30 further comprises successively a female shoulder 24 located innermost relative to the female external thread 26.

A female threaded section 23 extend between the female shoulder 24 and the female free end 25.

Figure 4:
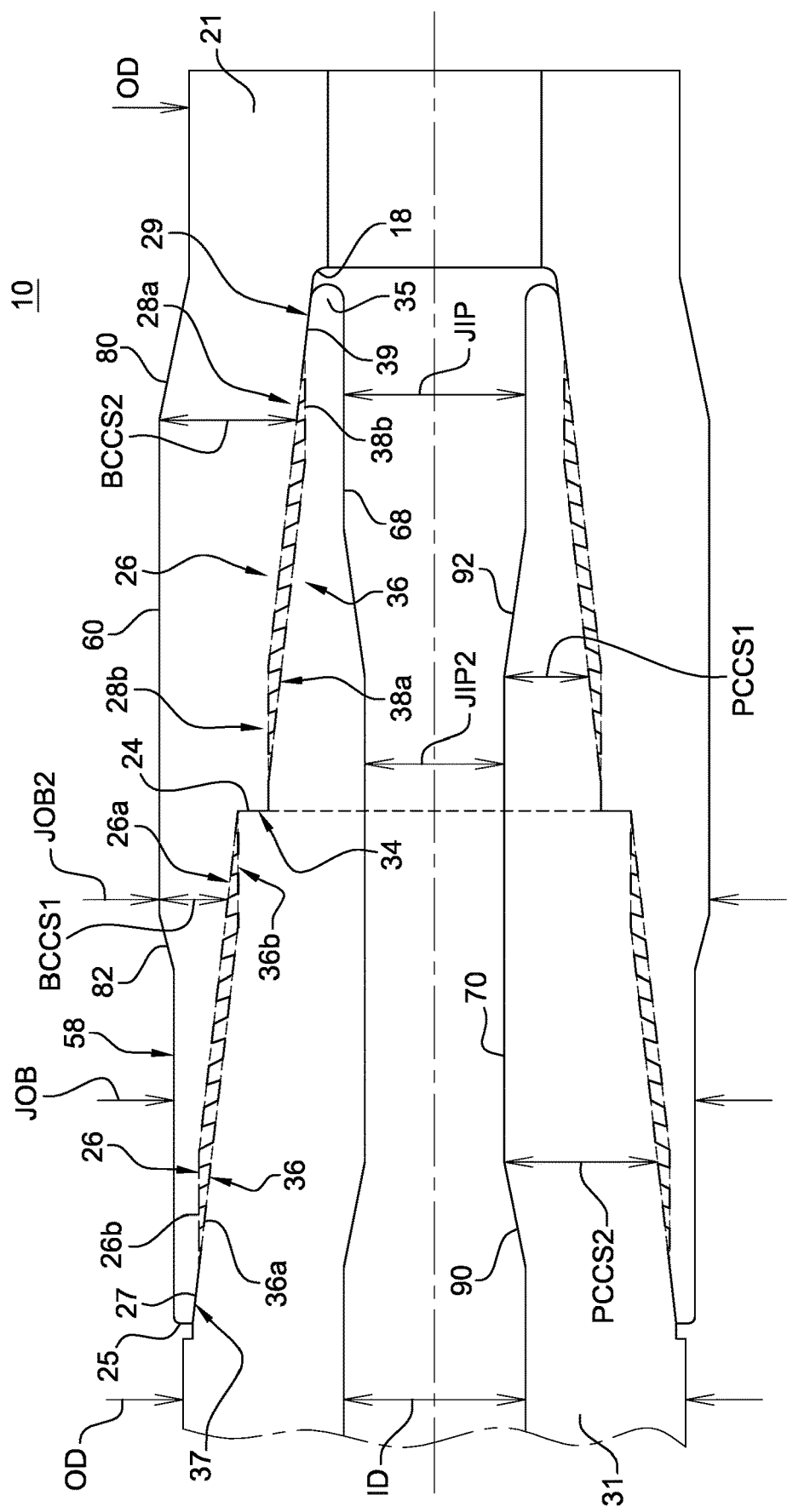
FIG. 4 is a partial cross-sectional view of a threaded connection according to a second embodiment of the invention, in a connected state.

According to FIGS. 1, 2 and 4, the box member 30 further comprises successively a female internal thread 28 and a female internal sealing surface 29 and an additional shoulder 18, said internal shoulder 18. The female shoulder 24 is located between the female external thread 26 and female internal thread 28, such that the female internal sealing surface 29 is located between the female internal thread 28 and the internal shoulder 18. The internal shoulder 18 is connected to a junction surface 81 defined between the internal shoulder 18 and the female main body 21. According to these embodiments, the female threaded section 23 is a female external threaded section 23, whereas the female internal thread 28 belongs to a female internal threaded section 43 defined between the female shoulder 24 and the internal shoulder 18.

The inner profile of the box member 20 is machined on the inner surface after having been expanded. The outer profile of the pin member 30 is machined on the outer surface after having been swaged.

The female external and internal threads 26 and 28 are radially offset and axially separated by the female shoulder 24. Female shoulder 24 preferably extends as an annular surface perpendicular to the XX' axis.

The female external and internal threads 26 and 28 are provided on a tapered surface, for example with a taper value between 1/19 and 1/8, preferably between 1/18 and 1/16. More particularly, a taper angle between a tapering axis of the female threads and the longitudinal axis XX' of the connection is at approximately 10°, such that the inner diameter of the box member 20 decreases from the free end 25 towards the female main body 21.

The female external and internal threads 26 and 28 may have the following features:
  a same pitch,
  same loading flanks angle with a negative angle value,
  same trapezoidal shape teeth profile,
  same longitudinal length.

The thread form of each threaded sections will not be described in detail. Each tooth of the threads may conventionally include a stabbing flank, a loading flank, a crest surface and a root surface. The teeth of both threaded sections may be inclined so that the stabbing flanks have a negative angle and the stabbing flanks have a positive angle, or the stabbing flanks have a positive angle and the stabbing flanks have a negative angle. Alternatively, the teeth of both threaded sections may be trapezoidal teeth.

Preferably, the threads of both threaded sections are not wedge. Wedge threads are characterized by threads, regardless of a particular thread form, that increase in width along one directions.

Preferably the threads according to the invention present loading flanks and stabbing flanks with the exact same pitch and lead.

Preferably the threads according to the invention present a diametrical interference.

The female external and internal threads 26 and 28 are configured to interlock by thread engagement with corresponding features of the pin member 30. By interlock by thread engagement it is encompassed that at least 2, and preferably at least 3 turns of a female thread is meshed within a spiralled groove defined between corresponding 2 to 3 turns of the male thread. When seen according to a longitudinal cross section, along XX' axis, each teeth of a male thread is located in between two adjacent teeth of the female thread, this being observable for at least 3 turns of a threaded section.

Figure 3:
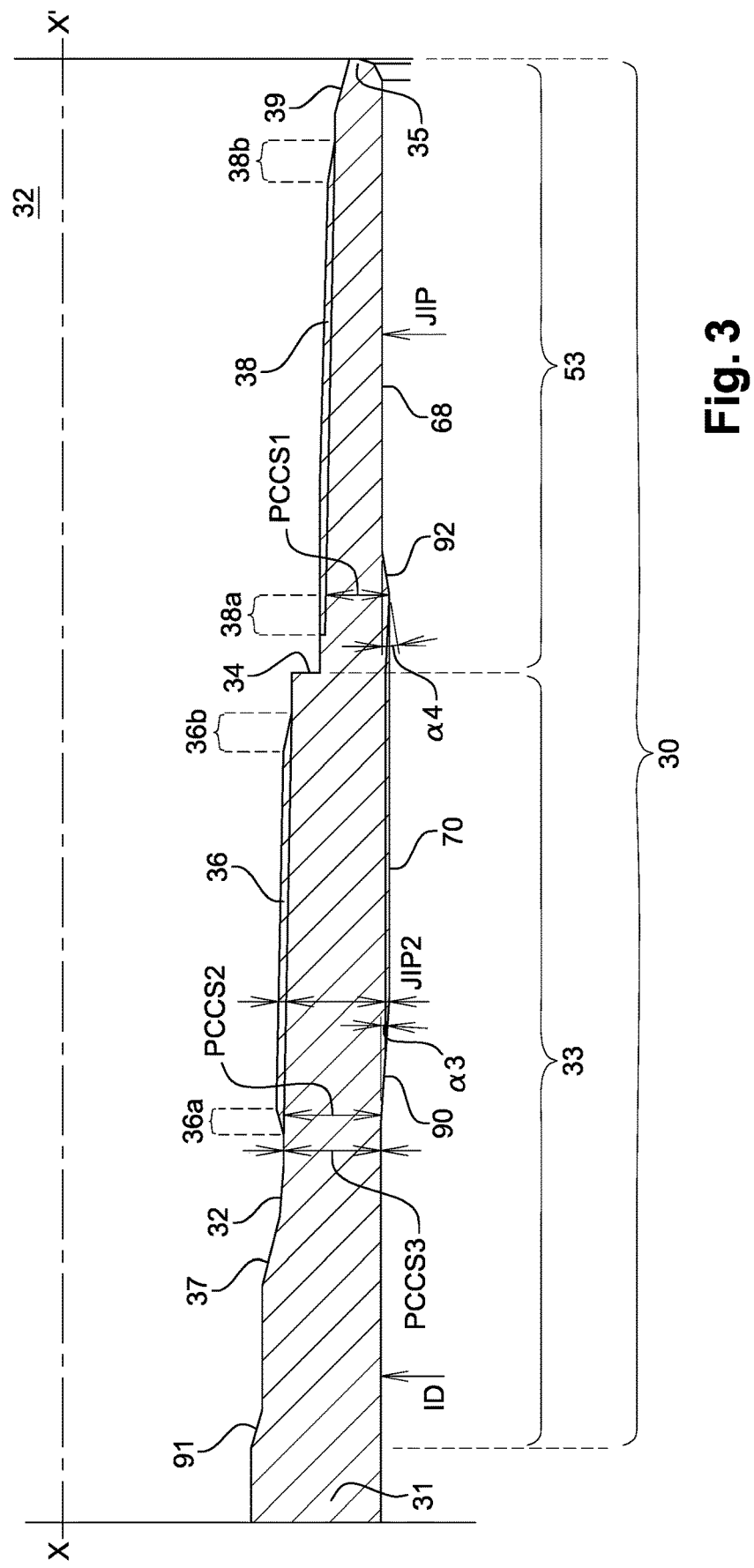
FIG. 3 is a partial cross-sectional view of a male tubular member of FIG. 1.

Thus, as illustrated in detail on FIG. 3, the pin member 30 comprises successively as from the male free end 35 on its external profile: a male inner sealing surface 39, a male internal thread 38, a male shoulder 34, a male external thread 36, a male external sealing surface 37, and a junction surface 91 to the male main body 31. A male threaded section 33 extends between the junction surface 91 and the male shoulder 34. According to the embodiments of FIGS. 1 to 4, the male threaded section 33 is a male external threaded section 33, whereas the male internal thread 38 belongs to a male internal threaded section 53 defined between the male shoulder 34 and the male free end 35.

According to the present invention, male free end 35 is not abutting with the tubular female end when the connection is made up.

The male external and internal threads 36 and 38 are radially offset and axially separated by the male shoulder 34. Male shoulder 34 preferably extends as an annular surface perpendicular to the XX' axis.

The female external and internal threads 26 and 28 are configured to interlock by thread engagement with respectively the male external and internal threads 36 and 38, such that they are respectively tapered along a same taper angle. The male external and internal threads 36 and 38 have the same pitch and lead, same as those of the female external and internal threads 26 and 28 respectively.

According to a first embodiment of the invention, each of the female external and internal threads 26 and 28 comprises a run-in portion 26a and respectively 28a on the side closest to the female main body 21 and a run-out portion 26b and respectively 28b on the opposite side.

Each of the male external and internal threads 36 and 38 comprises a run-in portion 36a and respectively 38a on the side closest to the male main body 31 and a run-out portion 36b and respectively 38b on the opposite side. Each run-in portion 26a and respectively 28a on the box member 20 engages a run-out portion 36b and respectively 38b on the pin member 30, and each run-in portion 36a and respectively 38a on the pin member 30 engages a run-out portion 26b and respectively 28b on the box member 20. Run-in thread and run-out thread are imperfect thread in the sense that they do not have the full height that is observed for the threaded portion in between respective run-in and run-out portions.

FIGS. 1 to 4, female and male thread comprises those run-in and run-out portions. According to an alternative not shown, the connection may comprise only full height thread.

In a made up state of the connection 10, a first engaged thread root of the female thread is the first tread root location, when considering successive thread root starting from the run-in portion 26a or 28a of the female external and respectively internal thread, where a corresponding thread of the male thread 36 or 38 is engaged. An engaged thread means that at least a portion of the loading flank of the female thread is contacting the corresponding loading flank of the male thread in the made up state. When considering successive thread root starting from run-in portions 26a and respectively 28a, first location of a female thread's loading flank to contact is adjacent to the first engaged thread root of the female external thread and respectively of the female internal thread.

In a made up state of the connection 10, a first engaged thread root of the male thread is the first tread root location, when considering successive thread root starting from the run-in portion 36a or 38a of the male external and respectively internal thread, where a corresponding thread of the female thread 26 or 28 is engaged. An engaged thread means that at least a portion of the loading flank of the male thread is contacting the corresponding loading flank of the female thread in the made up state. When considering successive thread root starting from run-in portions 36a and respectively 38a, first location of a male thread's loading flank to contact is adjacent to the first engaged thread root of the male external thread and respectively of the male internal thread.

According to FIGS. 1 and 4, the first engaged thread root of the female external thread is within the run-in portion 26a, and the first engaged thread root of the female internal thread is within the run-in portion 28a. Respectively, the first engaged thread root of the male external thread is within the run-in portion 36a, and the first engaged thread root of the male internal thread is within the run-in portion 38a. Following cross section are section across the box member and pin member respectively defined transversely to the XX' axis, and respectively named BCCS1 a section across the box member at the first engaged thread root of the female external thread, BCCS2 a section across the box member at the first engaged thread root of the female internal thread, PCCS1 a section across the pin member at the first engaged thread root of the male internal thread, PCCS2 a section across the pin member at the first engaged thread root of the male external thread.

According to FIGS. 1 to 4, BCCS1 falls within the run in portion 26a; BCCS2 falls within the run in portion 28a; PCCS1 falls within the run in portion 38a; and PCCS2 falls within the run in portion 36a. Thus BCCS1 is closer from the female shoulder 24 than from the female free end 25. BCCS2 is closer from the female internal sealing surface 29 than the female shoulder 24. PCCS1 is closer from the male shoulder 34 than the male free end 35, and PCCS2 is closer from the male external sealing surface 35 than the male shoulder 34.

A box critical cross section is a cross-sectional area of the box member 20 which undergoes the maximum tension transferred across all threads and defines efficiency of the connection. A pin critical cross section is a cross-sectional areal of the pin member 30 which undergoes full tension transferred across all threads and defines efficiency of the connection. Usually connection are made such that box critical cross section are generally within 95% and 105% of the pin critical cross section.

According to embodiment of FIGS. 1 to 4, with two threaded section 23, 43 and respectively 33 and 53, box critical cross section may be assessed by both BCCS1 and BCCS2, and respectively pin critical cross section may be assessed by both PCCS1 and PCCS2. Alternatively, box critical cross section and pin critical cross section may be defined at distinct location.

For example, according to FIG. 2, box critical cross section may be defined at the BCCS1 location and at another cross section BCCS3, perpendicular to XX' axis, within a groove 50 defined between the internal thread 28 and the female sealing surface 29. For example, according to FIG. 3, pin critical cross section may be defined at the PCCS1 location and at another cross section PCCS3, perpendicular to XX' axis, within a groove 52 defined between the male external thread 36 and the junction surface 91.

As illustrated, the female external sealing surface 27 is conical, and the male external sealing surface 37 is also conical. The taper of the conical surfaces 27 and 37 may be comprised between [10%; 60%], for example equal to 20% or 50%. The taper of the conical surfaces 27 and 37 may alternatively be mismatch. Female and male external sealing surfaces 27 and 37 create a metal-to-metal seal in a made up position of the connection 10.

The female internal sealing surface 29 is a convexly bulged surface for example a torical surface defined by a torus radius between 10 and 100 mm, for example equal to 60 mm; and the male internal sealing surface 39 is conical, for example with a taper comprised between 10% and 60%, for example equal to 20% or 50%. Both ends of the convexly bulged surface of the female internal sealing surface 29 may be on a line forming an angle with XX' axis, such that that angle equals an angle of the conical male internal sealing surface 39 with XX' axis. Female and male internal sealing surfaces 29 and 39 create a metal-to-metal seal in a made up position of the connection 10. Alternatively, external and internal metal-to-metal seals can be both of the cone-to-cone type with a substantially same taper. Alternatively, female and male external sealing surface 27 and 37 may define a tore-to-cone metal-to-metal seal.

In order to achieve a metal-to-meal seal, a diametrical interference is needed between female and male sealing surfaces. Diametrical interference value is the maximum difference between an outer diameter of the male sealing surface minus an inner diameter of the female sealing surface, diameters being considered at a same location along the XX' axis when the connection is made up, but diameters are those prior make-up. Diametrical interference is defined prior make up, based on FEA analysis and predictable final position of respectively the pin member into the box member at the end of make up.

For example, diametrical interference of the external metal-to-metal seal is comprised between 0.5 mm and 1.7 mm; preferably between 0.7 mm and 1.45 mm, and even more preferably between 0.81 mm and 1.33 mm. For example, diametrical interference of the internal metal-to-metal seal is comprised between 0.5 mm and 1.7 mm; preferably between 0.7 and 1.45 mm, and even more preferably between 0.81 mm and 1.22 mm. For example diametrical interference of the internal metal-to-metal seal is set below the diametrical interference of the external metal-to-metal seal. But alternatively, the diametrical interference of the internal metal-to-metal seal may be set equal to the diametrical interference of the external metal-to-metal seal.

Deflection of the box free end 25 outside of the connection due to the external metal-to-metal seal and deflection of the pin free end 35 inside the connection due to the internal metal-to-metal seal are limited by the specific features of the invention.

In the description, unless otherwise specified, all outer diameter and inner diameter dimensions are considered prior make up, as they stand after machining. According to manufacturing tolerances, all dimensions are specified with tolerances of +/−0.2 mm compared to a target value.

Advantageously, the box member 20 outer surface is partially machined. Above the female external sealing surface 27, the box member is machined in order to provide locally a cylindrical surface 58 with a first outer diameter JOB. Cylindrical surface 58 is cylindrical within tolerances of machining of metal parts.

Machined cylindrical surface 58 extends above both sides of the female external sealing surface 27. According to all embodiments, cylindrical surface 58 extends from the female free end 25 up to part of the female external thread 26. Cylindrical surface 58 presents a first outer diameter JOB.

According to the invention, a second outer diameter JOB2 is defined at a location above at least one thread root of the female internal thread 28.

All further ratios or delta identified below are considered based on the target value of each outer diameter or inner diameter.

For example, the ratio (JOB/OD) between the first outer diameter JOB and the outer nominal diameter OD is comprised between 100.5% and 103.5%, preferably between 100.8% and 103.2%, for example equal to 101.97%.

The cylindrical portion 58 connects an outwardly tapered surface 82 forming an angle α2 with the XX' axis. Angle α2 is comprised between 5° and 7°, for example equal to 6°. The outwardly tapered surface 82 connects another cylindrical surface 60 with an outer diameter equal to the second outer diameter JOB2. The conical tapered outer surface 80 with the α1 angle is immediately adjacent to the second cylindrical surface 60 with a second outer diameter JOB2. The second cylindrical surface 60 has a length along the XX' axis at least half the length, and preferably less than 150% of the first machined cylindrical surface 58, preferably between 70% and 100% of the length of the first machined cylindrical surface 58.

The ratio (JOB2/OD) between the second outer diameter JOB2 and the outer nominal diameter OD is comprised between 100.5% and 104%, preferably between 101.0% and 103.5%, even more preferably between 101.5% and 102.5%, for example equal to 102.3%.

The ratio (JOB2/JOB) between the second outer diameter JOB2 and the first outer diameter JOB is comprised between 100.05% and 101%, preferably between 100.1% and 100.4%, for example equal to 100.32%.

FIGS. 1 and 2, cylindrical portion 58 extends from the free end 25 up to a location above the external thread 26 away from the BCCS1 location. The cylindrical portion 60 with a constant diameter equal to the second outer diameter JOB2 extends above the intermediate shoulder 24 and up to the BCCS2 location. According to this embodiment, the outwardly tapered surface 82 extends above the BCCS1 location. The conical tapered outer surface 80 extends from BCCS2 up to the main body 21 in order to expand above the groove 50, the female internal sealing surface 29 and the internal shoulder 18, and beyond.

FIG. 4 is another embodiment of the invention, slightly distinct from the embodiment of FIGS. 1 to 3, in that sense that the conical tapered outer surface 80 extends from BCCS2 up to a location which is between the female internal sealing surface 29 and the internal shoulder 18, relative to the XX' axis.

Figure 5:
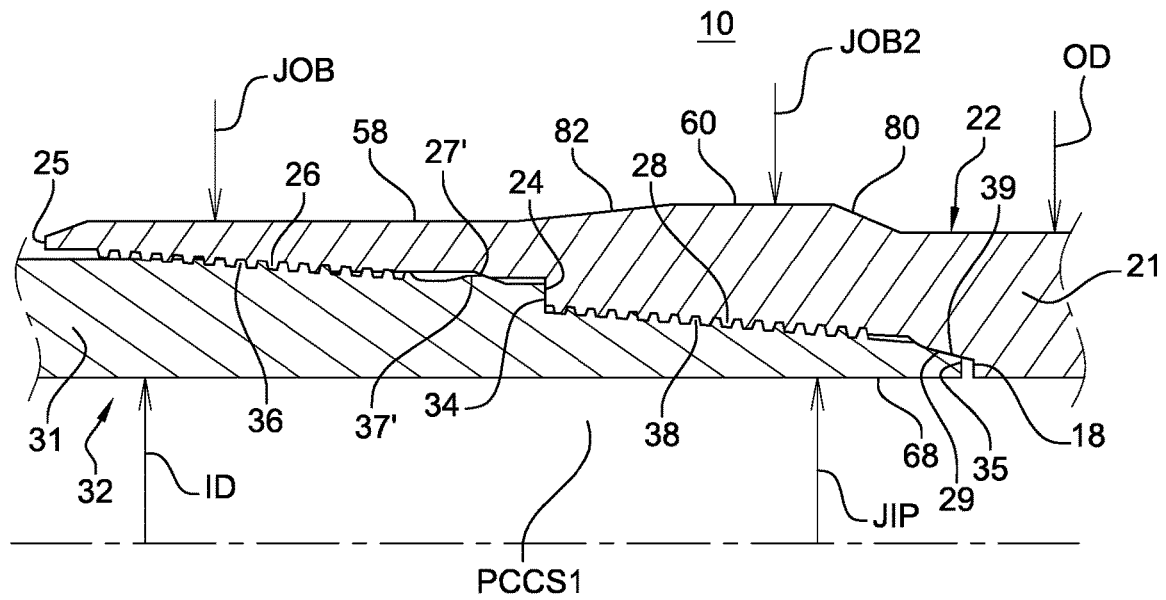
FIGS. 5 and 6 are partial cross-sectional view of threaded connection according to alternatives of a distinct embodiment of the invention, in a connected state.

FIG. 5 is distinguishable from the embodiments of FIGS. 1 to 4 in that sense that the external metal-to-metal seal is located between the female external thread 26 and the intermediate shoulder 24. According to the specific embodiment of FIGS. 5 and 6, female and male external sealing surfaces respectively 27' and 37' may also be called respectively female and male intermediate sealing surfaces 27' and 37'. The female external sealing surface 27' is located between the female external thread 26 and the female internal thread 28, and preferably between the female external thread 26 and the intermediate shoulder 24. Correspondingly, the male external sealing surface 37' is located between the male external thread 36 and the male internal thread 38, and preferably between the male external thread 36 and the intermediate shoulder 34.

FIG. 5, cylindrical portion 58 extends from the free end 25 up to a location above the external metal-to-metal seal 27', such that the tapered portion 82 expands at least above the intermediate shoulder 24. The cylindrical portion 60 with a constant diameter equal to the second outer diameter JOB2 is located at least above a run-out portion 28b of the female internal thread 28. According to FIG. 5, the cylindrical portion 60 extends over part of the female internal thread 28, while the tapered portion 80 expands and ends before a location above the internal metal sealing surface 29, such that the internal metal sealing surface 29 is defined at a location where the outer diameter equals the nominal outer diameter.

Figure 6:
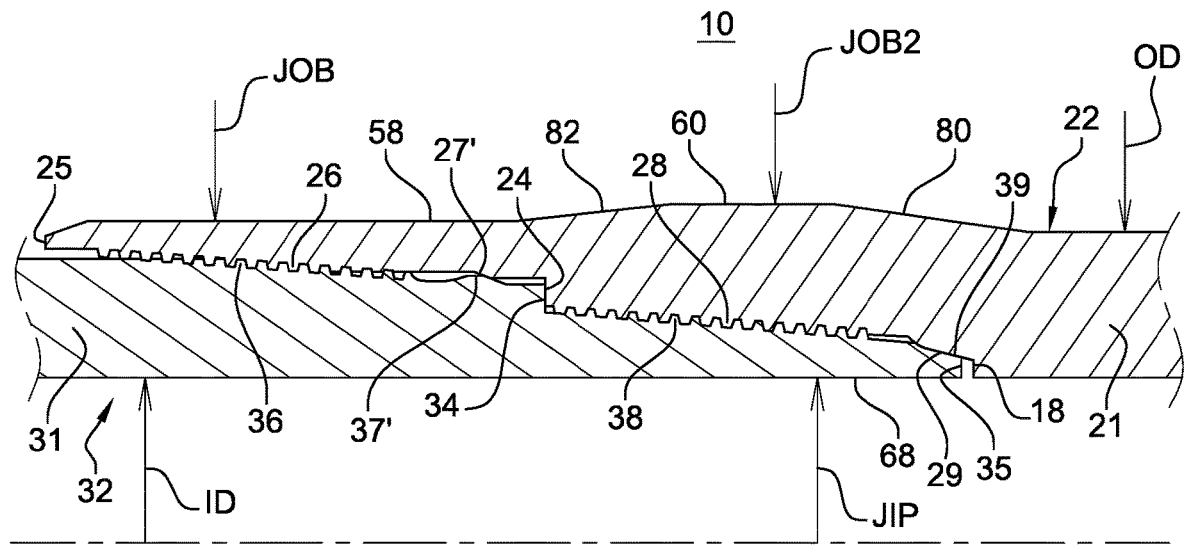

According to an alternative of FIG. 5, shown on FIG. 6, cylindrical portion 58 extends from the free end 25 up to a location above the external thread 26 away from the BCCS1 location, such that both BCCS1 location and the external metal sealing surface 27' are under the tapered portion 82. According to FIG. 6, the cylindrical portion 60 extends over part of the female internal thread 28, while the tapered portion 80 expands at least over the internal metal sealing surface 29.

Female free end 25 is free of any contact with any part of the tubular male end in a made up state. FIGS. 1 and 4, female free end 25 is facing the junction surface 91 held between the male end and the male main body 31, but the free end 25 remains at a non zero distance of that junction surface 91 in the made up state. FIGS. 5 and 6, junction surface 91 is not represented, female free end is not contacting any part of the tubular male end in a made up state. According to the present invention, female free end 25 is not abutting with the tubular male end when the connection is made up.

The invention may also provide in combination with the specific outer design of the box member, a specific design of the pin member.

Advantageously, the pin member 30 inner surface is partially machined. Below the male internal sealing surface 39, the pin member is machined in order to provide locally a first machined inner cylindrical surface 68. Inner cylindrical surface 68 is cylindrical within tolerances of machining of metal parts.

Machined inner cylindrical surface 68 extends on both sides of the male internal sealing surface 39. According to embodiments of FIGS. 1 to 4, the inner cylindrical surface 68 extends from the male free end 35 up to part of the male internal thread 38. Inner cylindrical surface 68 presents a first inner diameter JIP. According to the invention, a second inner diameter JIP2 is defined at a location above at least one thread root of the male external thread 36 such that the second inner diameter JIP2 is smaller than the first inner diameter JIP of the first machined inner surface 68.

The inner cylindrical portion 68 connects an inwardly tapered surface 92 forming an angle α4 with the XX' axis. Angle α4 is comprised between 5° and 7°, for example equal to 6°. The inwardly tapered surface 92 connects another inner cylindrical surface 70 having a constant diameter equal to the second inner diameter JIP2. A conical tapered inner surface 90, obtained through the swaging process, with the α3 angle is immediately adjacent to the second inner cylindrical surface 70 with the second inner diameter JIP2. The second inner cylindrical surface 70 has a length along the XX' axis at least half the length, and preferably less than 150% of the first machined inner cylindrical surface 68, preferably between 70% and 100% of the first machined inner cylindrical surface 68.

For example, the ratio (JIP/ID) between the first inner diameter (JIP) and a nominal inner diameter (ID) of the second tubular member 31 is comprised between 98% and 101.5%, preferably between 98.5% and 100.5%, even more preferably 99.2% and 100.3%, for example equal to 99.73%.

The ratio (JIP2/ID) between the second inner diameter (JIP2) and a nominal inner diameter of the main body of the first tubular member is comprised between 98.5% and 100%, preferably between 98.9% and 99.9%, for example equal to 99.3%.

The ratio (JIP2/JIP) between the second inner diameter (JIP2) and the first inner diameter (JIP) is comprised between 99% and 99.9%, for example equal to 99.5%.

FIGS. 1, 3 and 4, inner cylindrical portion 68 extends from the male free end 35 up to a location above the internal thread 38 away from the PCCS1 location. The second inner cylindrical portion 70 with a constant diameter equal to the second inner diameter JIP2 starts as of the PCCS1 location up to a location above the male external threads 36, between PCCS2 location and the middle of the male external thread along the XX' axis. According to this embodiment, the inwardly tapered surface 92 extends above a few, ie 1 to 4 thread turns of the internal thread 38 for example. The conical tapered inner surface 90 connects directly to the second inner cylindrical surface 70 and ends below the male external thread 36. Nominal inner diameter ID is defined below a junction surface 91 between the male end and the male main body 31, the male external sealing surface 27 and a groove 52 defined between the male external sealing surface 37 and the external thread 36.

FIGS. 1 to 4, when nominal outer diameter OD is of 355.6 mm, and nominal inner diameter ID is equal to 313.94 mm
- the length of the first cylindrical outer surface 58 is comprised between 98 mm and 109 mm
- the length of the second outer cylindrical surface 60 is comprised between 83 mm and 87 mm
- the first outer diameter JOB2 is comprised between 363.52 mm and 364.02 mm,
- the first outer diameter JOB is comprised between 362 mm and 363 mm, preferably between 362.36 mm and 362.86 mm.
- the first inner diameter JIP is comprised between 313 mm and 313.8 mm, preferably between 313.12 mm and 313.37 mm
- the second inner diameter JIP2 is comprised between 311 mm and 312.5 mm, preferably between 312 mm and 312.25 mm.

the length of the first inner cylindrical surface 68 is comprised between 88 mm and 100 mm, preferably between 89.75 and 99.75 mm the length of the second inner cylindrical surface 70 is comprised between 77 mm and 80 mm diametrical interference of the external metal-to-metal seal is comprised between 1.12 mm and 1.32 mm, such that a delta (JOB2-JOB) between the second outer diameter JOB2 and the first outer diameter JOB is between 85% and 90% of the diametrical interference of the external metal-to-metal seal diametrical interference of the internal metal-to-metal seal is comprised between 1.23 mm and 1.33 mm, such that a delta (JIP-JIP2) between the first inner diameter JIP and the second inner diameter JIP2 is between 91% and 116% of the diametrical interference value of the internal metal-to-metal seal;

diametrical interference of the external thread, if any, between 0 and 0.18 mm diametrical interference of the external thread, if any, between 0 and 0.18 mm.

According to the embodiments of FIGS. 1 to 4, the length along XX' axis of the second inner cylindrical surface 70 is inferior to the length of the second outer cylindrical surface 60.

When the connection is made up, the inner diameter profile of the pin member and the outer diameter profile of the box member are modified due to forces resulting from interference fit of the respective female and male sealing surfaces of the box and pin member and engagement of the threads.

FIG. 7 represents a view of the outer diameter at the nose of the box member after make-up. Due to make up forces, first cylindrical outer surface 58 is not anymore cylindrical, but tends to presents a slightly conical shape, with a maximum outer diameter close to the free end 25 and a lower diameter at the junction with the outwardly tapered surface 82. At all location along the cylindrical surface 58 and the second outer cylindrical surface 60, an outer diameter of the connection 10 remains below a threshold. Thanks to the specific feature of having both first and second cylindrical outer surface 58 and 60, there is no direct radial contact with box nose and casing already in place during installation. Indeed, the thickness of the box member 20 at the second critical cross section BCCS2 allows to the box member to have a better casing wear robustness, while allowing the connection to have a good efficiency.

Symmetrically due to make up forces, first cylindrical inner surface 68 is not anymore cylindrical, but tends to presents a slightly conical shape, with a minimum inner diameter close to the male free end 35 and a higher diameter at the junction with the inwardly tapered surface 92. At all location along the inner cylindrical surface 68 and the second inner cylindrical surface 70, an inner diameter of the connection 10 remains above a threshold, for example a drift diameter. Thanks to the specific feature of having both first and second inner cylindrical surface 68 and 70, there is no direct radial contact with pin nose and another casing to be settled in the well. Indeed, the thickness of the pin member 30 at the first critical cross section PCCS1 allows to the pin member to have a better casing wear robustness, while allowing the connection to have a good efficiency.

Thanks to the additional thickness at box and pin critical cross sections, the connection have a better casing wear robustness, while having a better efficiency and good performance when the connection is subjected to axial tension.

The service life of the connection is also improved since the free end of the box member is not in direct radial contact.

The invention claimed is:

1. A threaded tubular connection comprising:
a tubular female end extending from a main body of a first tubular member, the tubular female end comprising
a female external thread between a female shoulder and a female free end, and
a female internal thread, such that the female shoulder is a female intermediate shoulder located between the female external thread and the female internal thread,
a tubular male end extending from a main body of a second tubular member, the tubular male end comprising
a male external thread, a male internal thread and a male shoulder, said male external thread is configured to interlock by thread engagement with the female external thread, said male internal thread is configured to interlock by thread engagement with the female internal thread,
wherein the tubular female end comprises a first machined outer surface of the female end close to the female free end, a second outer diameter above at least one thread root of the female internal thread such that the second outer diameter is bigger than a first outer diameter of the first machined outer surface, and wherein the female free end is free of axial abutment contact with the tubular male end,
wherein the machined outer surface of the female end and the second outer diameter are connected with a taper surface forming a fitting angle comprised between 1° and 10°,
wherein the second outer diameter of the tubular female end is located above the intermediate shoulder, and
wherein the taper surface is positioned a first distance from the female shoulder, the taper surface is positioned a second distance from the female free end, and the first distance is smaller than the second distance.

2. The threaded tubular connection according to claim 1, wherein a ratio between the first outer diameter and a nominal outer diameter of male main body is comprised between 100.5% and 103.5%.

3. The threaded tubular connection according to claim 1, wherein the first machined outer surface extends above at least one thread root of the female external thread.

4. The threaded tubular connection according to claim 1, wherein an outer surface of the tubular female end having a greater outer diameter than the first outer diameter extends at least over a portion starting from a first box critical cross section up to a second box critical cross section of the tubular female end.

5. The threaded tubular connection according to claim 1, wherein the second outer diameter is constant over a second cylindrical surface, and the first machined outer surface comprises a cylindrical surface defined with that first outer diameter.

6. The threaded tubular connection according to claim 4, wherein the second cylindrical surface extends above the intermediate shoulder.

7. The threaded tubular connection according to claim 4, wherein the second cylindrical surface extends above a second box critical cross section located at a first engaged thread root of the female internal thread close to an internal shoulder.

8. The threaded tubular connection according to claim 4, wherein the second cylindrical surface extends above part of the female internal thread, and the first machined outer surface extends above part of the female external thread.

9. The threaded tubular connection according to claim 1, wherein the tubular female end comprises a female external sealing surface, and the tubular male end comprises a male external sealing surface, such that male and female external sealing surfaces are forming an external metal-to-metal seal when the threaded tubular connection is made up, and an outer diameter of the tubular female end above that female external sealing surface is equal to the first outer diameter.

10. The threaded tubular connection according to claim 9, wherein female external sealing surface is located between the female external thread and the female free end.

11. The threaded tubular connection according to claim 9, wherein female external sealing surface is located between the female external thread and the intermediate shoulder.

12. The threaded tubular connection according to claim 1, wherein the male free end is longitudinally away from the internal shoulder when the connection is made up.

13. The threaded tubular connection according to claim 1, wherein the female free end is longitudinally away from any part of the tubular male end when the connection is made up.

14. The threaded tubular connection according to claim 1, wherein the female intermediate shoulder and the male intermediate shoulder are abutting when the connection is made up.

15. The threaded tubular connection according to claim 1, wherein the male and female thread, respectively external and internal, are offset radially with respect to a longitudinal axis of the threaded connection.

16. The threaded tubular connection according to claim 1, wherein a cylindrical surface having said second outer diameter is connected to the main body of the first tubular member having a nominal outer diameter with a taper surface forming an expansion angle comprised between 2° and 5°.

17. The threaded tubular connection according to claim 16, wherein the tubular female end comprises a female internal sealing surface, the tubular male end comprises a male internal sealing surface, wherein the female internal sealing surface is located between the female internal thread and an internal shoulder, the male internal sealing surface is located between the male internal thread and a male free end, such that male and female internal sealing surfaces are forming an internal metal-to-metal seal when the threaded tubular connection is made up.

18. The threaded tubular connection according to claim 9, wherein a delta between the second outer diameter and the first outer diameter is between 30% and 130% of a diametrical interference of the external metal-to-metal seal.

19. The threaded tubular connection according to claim 1, wherein a delta between the second outer diameter and the first outer diameter is between 25% and 115% of a maximum diametrical interference value, such maximum diametrical interference value being the highest value among diametrical interference values of the external thread, an internal metal-to-metal seal, and an external metal-to-metal seal.

20. The threaded tubular connection according to claim 1, wherein a ratio between the second outer diameter and a nominal outer diameter of the main body of the first tubular member is comprised between 100.5% flush and 104%.

21. The threaded tubular connection according to claim 1, wherein after thread engagement of the tubular female end with the tubular male end, at the end of make-up of the threaded tubular connection, an outer diameter of the tubular female end at both locations above the external thread and internal thread are below a same threshold of 105%.

* * * * *